(12) United States Patent
Yamada et al.

(10) Patent No.: US 6,722,641 B2
(45) Date of Patent: Apr. 20, 2004

(54) LIQUID FILLED TYPE VIBRATION ISOLATOR (75) Inventors: Norihiro Yamada, Aichi-ken (JP); Tatsuo Suzuki, Aichi-ken (JP); Keiji Miyoshi, Aichi-ken (JP); Yoshiki Shimoda, Aichi-ken (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 60 days.

(21) Appl. No.: 09/953,906

(22) Filed: Sep. 18, 2001

(65) Prior Publication Data

US 2002/0033568 A1 Mar. 21, 2002

(30) Foreign Application Priority Data

Sep. 19, 2000 (JP) ........................... 2000-282898
Sep. 27, 2000 (JP) ........................... 2000-293404

(51) Int. Cl.⁷ ............................................. F16F 15/00
(52) U.S. Cl. .............................. 267/140.14; 267/140.15
(58) Field of Search .................. 267/140.14, 140.15, 267/140.13

(56) References Cited

U.S. PATENT DOCUMENTS

| 4,693,455 | A | * | 9/1987 | Andra | 267/140.14 |
|---|---|---|---|---|---|
| 4,721,292 | A | * | 1/1988 | Saito | 267/140.13 |
| 5,560,592 | A | * | 10/1996 | Shimoda et al. | 267/140.13 |
| 5,620,168 | A | * | 4/1997 | Ohtake et al. | 267/140.13 |
| 5,628,498 | A | * | 5/1997 | Nanno | 267/140.13 |
| 6,082,718 | A | | 7/2000 | Yamada et al. | 267/140.14 |
| 6,199,842 | B1 | * | 3/2001 | Gennesseaux et al. | 267/140.13 |
| 6,364,294 | B1 | * | 4/2002 | Gennesseaux et al. | 267/140.13 |
| 6,485,005 | B1 | * | 11/2002 | Tewani et al. | 267/140.13 |

FOREIGN PATENT DOCUMENTS

| EP | 0 440 260 A1 | 8/1991 | |
|---|---|---|---|
| EP | 0 984 193 A1 | 3/2000 | |
| EP | 984193 A1 | * 3/2000 | ............ F16F/13/26 |
| JP | 61-278639 | 12/1986 | |
| JP | 04-077041 | 7/1992 | |

* cited by examiner

Primary Examiner—Robert A. Siconolfi
(74) Attorney, Agent, or Firm—Westerman Hattori Daniels & Adrian, LLP (57) ABSTRACT There is provided a liquid filled type vibration isolator in which damping action for both engine idling vibration and engine shake is carried out with the use of a single orifice. In the liquid filled type vibration isolator comprising a rubber-like insulator for absorbing and isolating vibration transmitted from an oscillating body, a main chamber having a chamber wall formed by a part of the insulator, and hermetically charged therein with liquid, an auxiliary chamber connected to the main chamber through the intermediary of an orifice and having a chamber wall a part of which is formed by a first diaphragm, a partition member partitioning between the main chamber and the auxiliary chamber, a working chamber defined and formed with respect to the main chamber by means of a second diaphragm, wherein the second diaphragm has a deforming stiffness which is higher than that of the first diaphragm. The liquid in the orifice effects resonant oscillation with a vibration input during engine idling operation.

8 Claims, 10 Drawing Sheets

LIQUID FILLED TYPE VIBRATION ISOLATOR

BACKGROUND OF THE INVENTION

The present invention relates to a liquid filled type vibration isolator which is aimed at isolating vibration in a specific frequency range, and in particular, to a liquid filled type vibration isolator incorporating a diaphragm and an orifice which are adapted to isolate vibration in two frequency ranges, that is, for example, an engine idling vibration range and an engine shake range, respectively, and which are incorporated in a partition member partitioning between a main chamber and an auxiliary chamber in the vibration isolator. Further, the present invention also relates to a liquid filled type vibration isolator which can prevent a dynamic spring constant from extremely increasing even though the engine idling vibration frequency varies caused by an increase in engine idling speed.

Among vibration isolators, engine mounts or the like for automobiles, have to cope with vibration over a wide frequency range since an engine as a power source is used under various conditions over a wide speed range from an idle speed to a maximum speed. Thus, there was proposed and have been well-known a switching and liquid filled type vibration isolator defining therein two liquid chambers which are communicated with each other through an orifice, and having a vibration isolating mechanism which is composed of a diaphragm configured to carry out free oscillation in response to variation in liquid pressure in the above-mentioned liquid chambers, a working chamber and the like, as disclosed in JP-A-4-77041.

By the way, in the above-mentioned prior art, the atmospheric pressure is led into the working chamber which is therefore set in a condition opened to the atmosphere, and a second diaphragm defining the working chamber is held in a free oscillation condition. With this arrangement, as to inputted engine idling vibration, variation in liquid pressure in the main chamber is absorbed through free oscillation of the second diaphragm in order to aim at absorbing and isolating the engine idling vibration. Meanwhile, as to the engine shake having a frequency range which is lower than that of the engine idling vibration, liquid is positively led from the main chamber through the orifice so as to effect a high damping characteristic. Thus, the above-mentioned prior art allows the orifice to serve as only a damping force exhibiting mechanism for damping the engine shake. Further, in addition to the first diaphragm partitioning between the auxiliary chamber and the air chamber, since the second diaphragm is provided, independent from the first diaphragm, and so forth, there has been raised such a problem that the overall manufacturing cost would inevitably increased, in view of assembling workability, parts control and the like.

SUMMARY OF THE INVENTION

The present invention is devised in order to solve the above-mentioned problems, and accordingly, an object of the present invention is to provide a liquid filled type vibration isolator which enables the above-mentioned orifice to damp the engine idling vibration and in which the first diaphragm is integrally incorporated with the second diaphragm in order to aim at reducing the overall manufacturing cost.

To the end, according to the present invention, there are provided the following arrangements. That is, according to a first aspect of the present invention, there is provided a liquid filled type vibration isolator comprising a first coupling member attached to an oscillating body, a second coupling member attached to a member on a vehicle body side, a rubber-like insulator provided between the first coupling member and the second coupling member, for absorbing vibration from the vibrating body, a main chamber having a chamber wall defined by a part of the insulator and filled therein with liquid, an auxiliary chamber communicated with the main chamber through the intermediary of a first orifice, and having a chamber wall apart of which is defined by the first diaphragm, a partition member partitioning between the main chamber and the auxiliary chamber, and a second diaphragm partitioning between a working chamber into which negative pressure or the atmospheric pressure is selectively introduced, wherein the second diaphragm defines the working chamber and has a rigidity for flexible stiffness which is higher than that of the first diaphragm defining the auxiliary chamber.

With this arrangement, according to the present invention, only one orifice is used for exhibiting a damping function against the engine shake, and as to the engine idling vibration, liquid within the orifice is subjected to resonance so as to aim at reducing the dynamic spring constant in this frequency range. As a result, with the use of only one orifice, it is possible to damp two kinds of vibration such as engine shake and engine idling vibration.

Next, according to a second a second aspect of the present invention, which is basically similar to the first aspect of the present invention, there is provided a liquid filled type vibration isolator as set forth in the first aspect of the present invention, wherein a third liquid chamber is provided between the first diaphragm and the main chamber and a second orifice through which liquid flows is provided between the third liquid chamber and the main chamber.

With this arrangement, according to the present invention, the second orifice is prepared for mainly isolating the engine idling vibration, and the first orifice is prepared for absorbing and isolating the engine shake, thereby it is possible to efficiently absorb and isolate both engine shake and engine idling vibration.

Further, according to a third aspect of the present invention, which is similar to the first aspect of the present invention, there is provided a liquid filled type vibration isolator as set fort in the first aspect of the present invention, wherein liquid in the first orifice and liquid in the second orifice are associated with each other in response to a specific frequency.

With this arrangement, according to the present invention, the dynamic spring constant in this liquid filled type vibration isolator is reduced over a full frequency range in its entirety, and a reduced (bottom) range of the dynamic spring constant in each of two specific frequency ranges within an engine idling frequency range. As a result, it is possible to aim at reducing the dynamic spring constant even in a vibration range during idle-up due to operation of accessories, in addition to the engine idling vibration. That is, it is possible to cope with isolation of vibration in both cases of normal idling vibration and vibration during idle-up.

Next, according to a fourth aspect of the present invention which is similar to any of the first to third aspects of the present invention, there is provided a liquid filled type vibration isolator as set forth in any of the first to third aspects of the present invention, wherein the first diaphragm and the second diaphragms are integrally incorporated with each other.

With this arrangement, according to the present invention, it is possible to aim at reducing the costs of manufacturing two diaphragms, that is, the first and second diaphragms. As a result, it is possible to aim at reducing the costs of manufacturing the liquid filled type vibration isolator in its entirety. Namely, for example, the two diaphragms can be molded in a bundle by a suitable molding means, thereby it is possible to reduce the total manufacturing costs including a cost for parts control.

Next, according to a fifth aspect of the present invention which is similar to any of the first to fourth aspects of the present invention, there is provided a liquid filled type vibration isolator as set forth in any of the first to fourth aspects of the present invention, wherein a sealed air chamber is formed making contact with the first diaphragm and defined by a space in which air is hermetically sealed, and a third diaphragm is also provided forming a one of walls of the sealed air chamber while an auxiliary chamber adapted to operate the first and second diaphragms which define the above-mentioned sealed air chamber is provided for selectively introducing negative pressure or the atmospheric pressure.

With this arrangement, according to the present invention, the following effects can be exhibited: That is, in the present invention, only one orifice can exhibit a damping function for engine shake, and liquid is resonated in the orifice in order to cope with engine idling vibration, thereby it is possible to aim at reducing the dynamic spring constant in this vibration frequency range. As a result, two vibration damping functions, that is, for example, damping of engine shake and damping of engine idling vibration, can be exhibited. Further, the dynamic spring constant of the liquid filled type vibration isolator can have a generally high value in such a case that both chambers are in a vacuum suction condition, but an extreme increase in the dynamic spring constant in a frequency range slightly deviated from a specific frequency can be restrained by the action of the abovementioned sealed air chamber.

With this arrangement, it is possible to avoid extremely increasing the dynamic spring constant even though the idling speed of the engine varies (increases) upon engine idle-up, thereby it is possible to aim at absorbing and isolating idling vibration upon engine idling up.

Next, according to a sixth aspect of the present invention which is similar to any of the first to fifth aspects of the present invention, there is provided a liquid filled type vibration isolator as set forth in any one of the first to third aspects of the present invention, wherein a partition member and a metal member combined with this partition member are formed by pressing a metal sheet, and these two members hold therebetween the first and second diaphragms so as to secure them.

With this arrangement, according to the present invention, the following effects can be exhibited: That is, in the present invention, the partition member and the metal member can be formed by pressing a metal sheet, thereby it is possible to reduce the total manufacturing costs and lighten the total weight.

DESCRIPTION OF THE PREFERRED EMBODIMENTS

Figure 1:
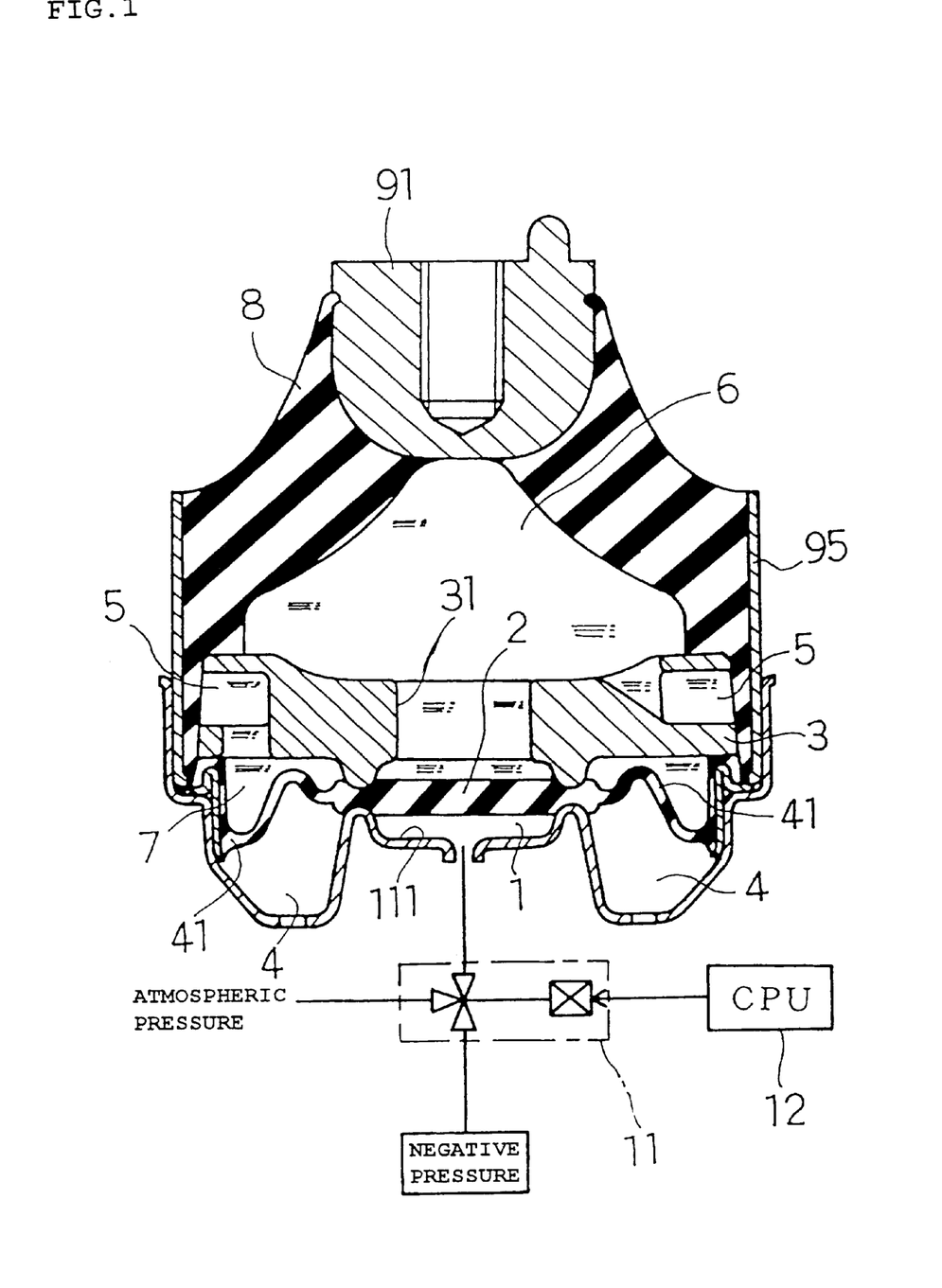
FIG. 1 is a longitudinal sectional view illustrating an entire configuration of a first embodiment of the present invention.

Explanation will be hereinbelow made of embodiments of the present inventions with reference to FIGS. 1 to 10. Referring to FIG. 1 which shows a first embodiment of the present invention, among these embodiments, this configuration is basically composed of a first coupling member 91 attached to an oscillating body side, a second coupling member 95 attached to a member or the like on a vehicle body side, an elastic or rubber-like insulator 8 between the first coupling member 91 and the second coupling member 95, for isolating vibration from the oscillating body, a main chamber 6 and an auxiliary chamber 7 which are provided in series to the insulator 8 and which are filled therein with liquid which is incompressible fluid, a first orifice through which the liquid flows between the main chamber 6 and the auxiliary chamber 7, a communication passage 31 formed in a partition member 3 partitioning between the main chamber 6 and the auxiliary chamber 7 and communicated with the main chamber 6, a first diaphragm 41 forming a part of a chamber wall of the auxiliary chamber 7 and partitioning thereof from an air chamber 4, a second diaphragm 2 provided in the communication passage 31 formed in the partition wall 3, being adapted to oscillate in response to variation in pressure of the liquid in the main chamber 6, and partitioning the main chamber 6 from a working chamber as stated below, the working chamber 1 having a chamber wall a part of which is formed by the second diaphragm 2, and adapted to be selectively introduced therein with negative pressure or the atmospheric pressure, and a switching means 11 adapted to selectively operate so as to introduce the atmospheric air or negative pressure in a predetermined condition into the working chamber 1.

With the above-mentioned configuration, the dimensions of the first orifice 5, are set so that liquid which is present in the first orifice 5 is resonated with engine idling vibration transmitted to the liquid in the main chamber 6 in such a case that the second diaphragm 2 is in a vacuum suction condition. That is, the diameter and the length of the first orifice 5 are set so that the liquid in the first orifice 5 is resonated at a specific frequency in a range from 15 to 18 Hz which is a vibration frequency range during engine idling operation under a predetermined expansible dynamic spring constant which is mainly determined by the insulator 8 forming a part of the main chamber 6. On the contrary, the flexible stiffness of the second diaphragm 2 in such a case that the working chamber 1 is in an atmospherically opened condition has a value which is higher than that of the first diaphragm 41, and which is sufficiently high so that the liquid flows from the main chamber 6 into the auxiliary chamber 7 through the first orifice 5 upon input of engine shake. Thus, the flexible stiffness of the second diaphragm 2 is suitable set in combination of the deformable stiffness of the insulator 8 forming a part of the wall chamber of the main chamber 6, in consideration with the fluidity of liquid flowing into the first orifice 5 upon input of engine shake.

Accordingly, when the above-mentioned working chamber 1 is in the atmospherically opened condition, the second diaphragm 2 is set in a condition that its flexible deformation is harder than that of the first diaphragm 41, and as a result, upon input of vibration (it is mainly caused by engine shake) into the liquid in the main chamber 6, it is likely to cause an increase in pressure of the liquid in the main chamber 6 so that the liquid flows from the main chamber to the auxiliary chamber 7 through the first orifice 5. Further, with this arrangement, referring to FIG. 1, the first diaphragm 41 and the second diaphragm 2 constitute such a configuration that a disc-like second diaphragm 2 is located in a center part and a ringlike first diaphragm 41 is arranged around the former. Thus, they are integrally incorporated with each other by a predetermined integrally molding means. Accordingly, the number of components in a diaphragm assembly composed of the first diaphragm 41 and the second diaphragm 2 can be reduced, thereby it is possible to aim at reducing the costs of parts control and the total manufacturing costs including man-hours for assembling thereof.

The switching means 11 adapted to carry out switching operation for selectively introducing the atmospheric pressure or negative pressure into the working chamber 1 which is partitioned and defined by the second diaphragm 2 having the above-mentioned configuration, is mainly composed of a three-way selector valve incorporating a solenoid mechanism adapted to carry out switching operation of the three-way selector valve. Further, the switching operation of the switching means 11 composed of the three-way selector valve is controlled by a predetermined control means 12 including a microcomputer and the like.

Figure 7:
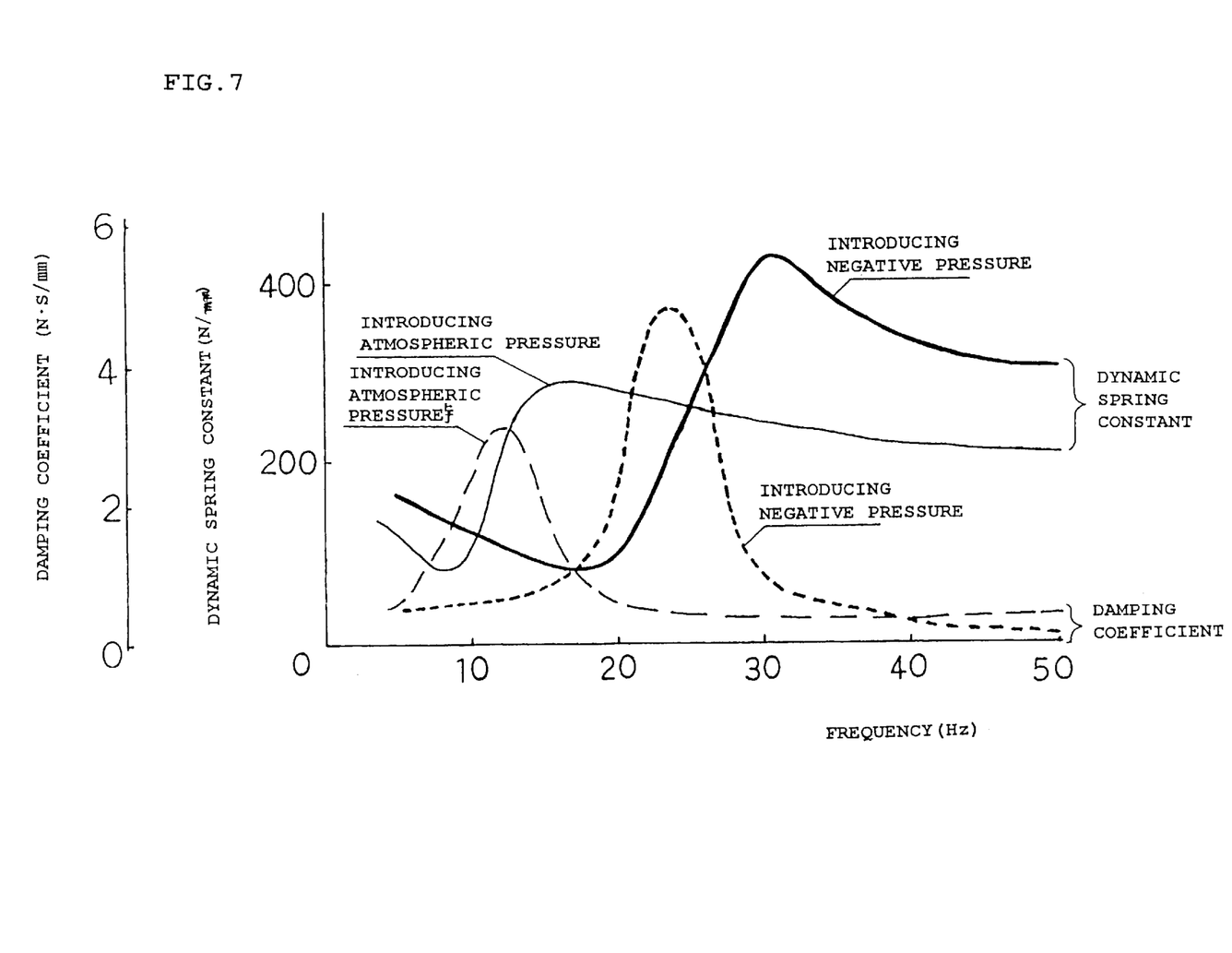
FIG. 7 is a graph showing a functional characteristic of the first embodiment of the present invention.

Next, explanation will be made of operation of this embodiment having a configuration as mentioned above. At first, the damping operation against engine idling vibration will be explained. In this case, the switching means 11 is operated in response to an instruction (signal) from the control means 12 so that the working chamber 1 is held in a vacuum suction condition. As a result, the second diaphragm 2 is sucked to the bottom wall 111 of the working chamber 1. In this condition, when vibration is inputted into the liquid in the main chamber 6 through the intermediary of the insulator 8, variation in pressure of the liquid in the main chamber 6 generally causes an increase in the dynamic spring constant since no means of escape is present. However, in the configuration of this embodiment, since the dimensions of the first orifice 5 are set so that the resonant frequency of liquid in the first orifice 5 is coincident with an input frequency of the engine idling vibration, the liquid in the first orifice 5 is resonated in response to the input of the vibration (engine idling vibration) at the specific frequency. As result, the dynamic spring constant of the entire liquid filled type vibration isolator is reduced as shown in FIG. 7 with respect to the vibration input at this specific frequency. That is, referring to FIG. 7, a lower limit value of the dynamic spring constant can be obtained in a specific frequency range from 15 to 18 Hz (engine idling vibration range). Thus, it is possible to effectively isolate or absorb engine idling vibration.

Meanwhile, as to the damping of the engine shake which is vibration at a frequency lower than that of the engine idling vibration, referring to FIG. 1, the switching means is changed into the atmospheric air introducing side. Further, the working chamber 1 is set in an atmospherically opened condition, and accordingly, the second diaphragm 2 partitioning between the working chamber 1 and the main chamber 6, and the first diaphragm 41 partitioning between the auxiliary chamber 7 and the air chamber 4 are both set in a free oscillation condition. In such a condition, when vibration relating to the engine shake is inputted, the first diaphragm 41 and the second diaphragm 2 perform flexible deformation in response to vibration produced in the liquid in the main chamber 6 since both diaphragms 41, 2 fall in the free oscillation condition. By the way, in this case, in the configuration of this embodiment, since the stiffness of the second diaphragm 2 is set to be higher than that of the first diaphragm 41, the liquid in the main chamber 6 preferentially flows into the first orifice 5. That is, the liquid flows from the main chamber 6 into the first orifice 5 so as to exhibit a high damping force (as is indicated by the thin broken line in FIG. 7). As a result, the engine shake can be damped. Thus, in the configuration of this embodiment, only one orifice (the first orifice 5) can exhibit a damping force generating function for damping engine shake, and the resonance action of liquid in the orifice can exhibit a dynamic spring constant reducing function against engine idling vibration. That is, with the use of the single orifice and the diaphragms having flexible stiffness, the damping action against two kinds of vibration, for example, engine shake and engine idling vibration can be made.

Figure 2:
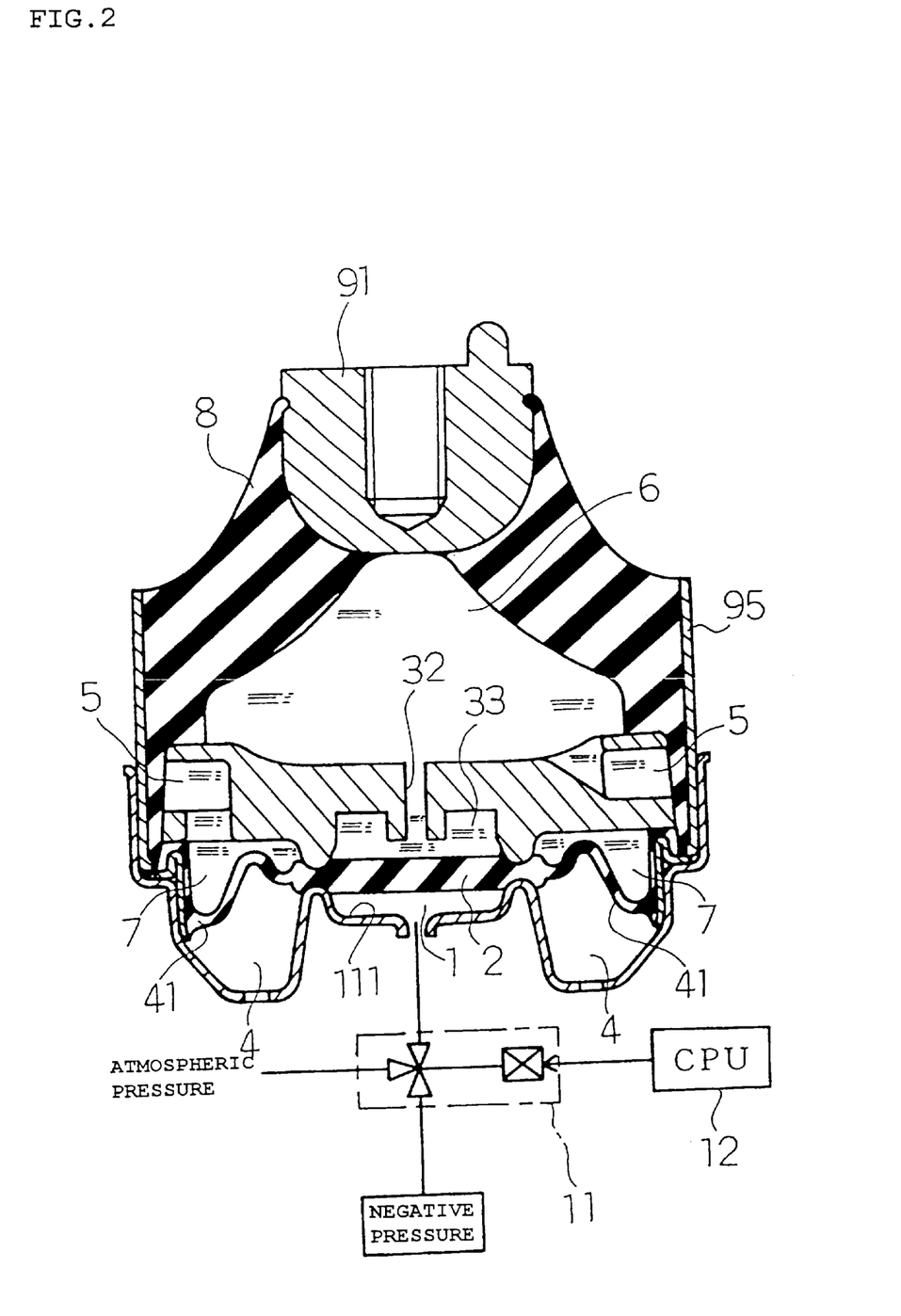
FIG. 2 is a longitudinal sectional view illustrating an entire configuration of a second embodiment of the present invention.
Figure 8:
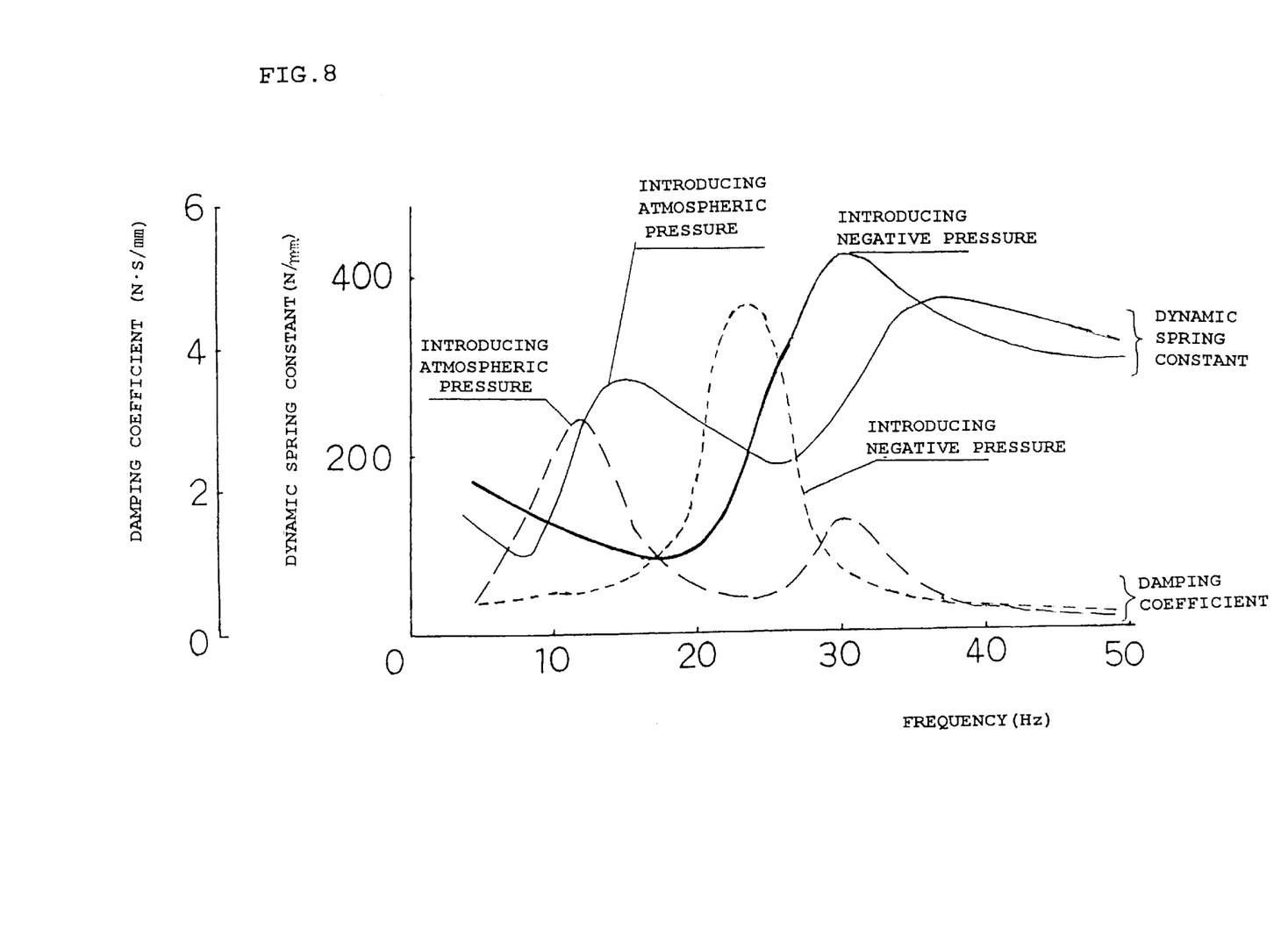
FIG. 8 is a graph showing a functional characteristic of the second embodiment of the present invention.

Next, explanation will be made of a second embodiment of the present invention with reference to FIGS. 2 and 8, which is basically the same as the first embodiment, except that a second orifice 32 is provided between the second diaphragm 2 and the main chamber 6, and a third liquid chamber 33 communicated with the second orifice 32 is provided. That is, the third liquid chamber 33 is provided, making contact with the second diaphragm 2 defining the working chamber 1 and having a predetermined volume, and the third liquid chamber 33 and the main chamber 6 are communicated with each other through the second orifice 32 having a predetermined diameter and a predetermined length. Further, the dimensions of both first orifice 5 and the second orifice 32 having the above-mentioned configuration are set so that liquid in both orifices are associated with each other in response to vibration input at a specific frequency. Specifically, referring to FIG. 8, the dimensions (the diameter and the length) of the second orifice 32 are set so that the oscillation of liquid in the second orifice 32 and the oscillation in the first orifice 5 are associated with each other around 25 Hz in such a case that the second diaphragm 2 falls in a free oscillation condition when the working chamber 1 is in an atmospherically opened condition. Accordingly, a lower limit value in the dynamic spring constant can be obtained in the entire liquid filled type vibration isolator can be obtained even around 25 Hz (as indicated by the thin solid line in FIG. 8).

Explanation will be made of this embodiment having the above-mentioned configuration. First, the absorption and the isolation of engine idling vibration will be explained. As to, inter alia, the absorption and isolation of vibration in the frequency range from 15 to 18 Hz, referring to FIG. 2, the switching means 11 is operated in accordance with an instruction (signal) from the control means 12 so that the working chamber 1 falls in a negative pressure condition. Further, the second diaphragm 2 is held in such a condition that it is sucked to the bottom wall 111 of the working chamber 1. In this condition, the lower limit value of the dynamic spring constant (as shown in the bold solid line in FIG. 8) can be obtained due to resonant action of liquid in the first orifice 5 in response to an engine idling vibration input at a frequency from 15 to 18 Hz, similar to that stated in the above-mentioned first embodiment. On the contrary, when the engine idling vibration is increased due to the operation of the engine accessories, that is, during engine idling-up, the switching means 11 shown in FIG. 2 is operated in response to an instruction (signal) from the control means 12 so that the working chamber 1 falls in an atmospherically opened condition in order to hold the second diaphragm 2 in a free oscillating condition. In such a condition, when vibration at a specific frequency is inputted to the liquid in the main chamber 6, the second diaphragm 2 performs free oscillation due to oscillation of liquid by way of the second orifice 32. Further, at this time, due to resonant action of liquid in the second orifice 32, the dynamic spring constant is reduced in a specific frequency range.

Further, the liquid in the first orifice 5 also exhibits oscillating action more or less due to free oscillation of the second diaphragm 41. Moreover, at this time, the oscillating action of the liquid in the first orifice 5 and the resonant action of the liquid in the second orifice 32 are associated with each other, and accordingly, variation in the pressure of liquid in the main chamber 6 can be absorbed greatly. As a result, the dynamic spring constant of the entire liquid-filled type vibration isolator is reduced, that is, as indicated by the thin solid line in FIG. 8, the lower limit value of the dynamic spring constant can be obtained around 25 Hz. With this arrangement, vibration is absorbed and isolated during engine idling-up.

It is noted that the damping of engine shake is the same as that explained in the first embodiment. That is, by setting the working chamber 1 in the atmospherically opened condition, the second diaphragm 2 falls in the free oscillating condition. Further, in this condition, the first diaphragm 41 also falls in a free oscillating condition. Further, in this condition, the flexibly deforming stiffness of the second diaphragm 2 is set in its value to be higher than that of the first diaphragm 41, and accordingly, the liquid in the main chamber 6 preferentially flows into the first orifice 5. As a result, due to flowing of the liquid into the first orifice 5, a predetermined damping force (peak value) can be obtained (as indicated by the thin broken line in FIG. 8).

Figure 3:
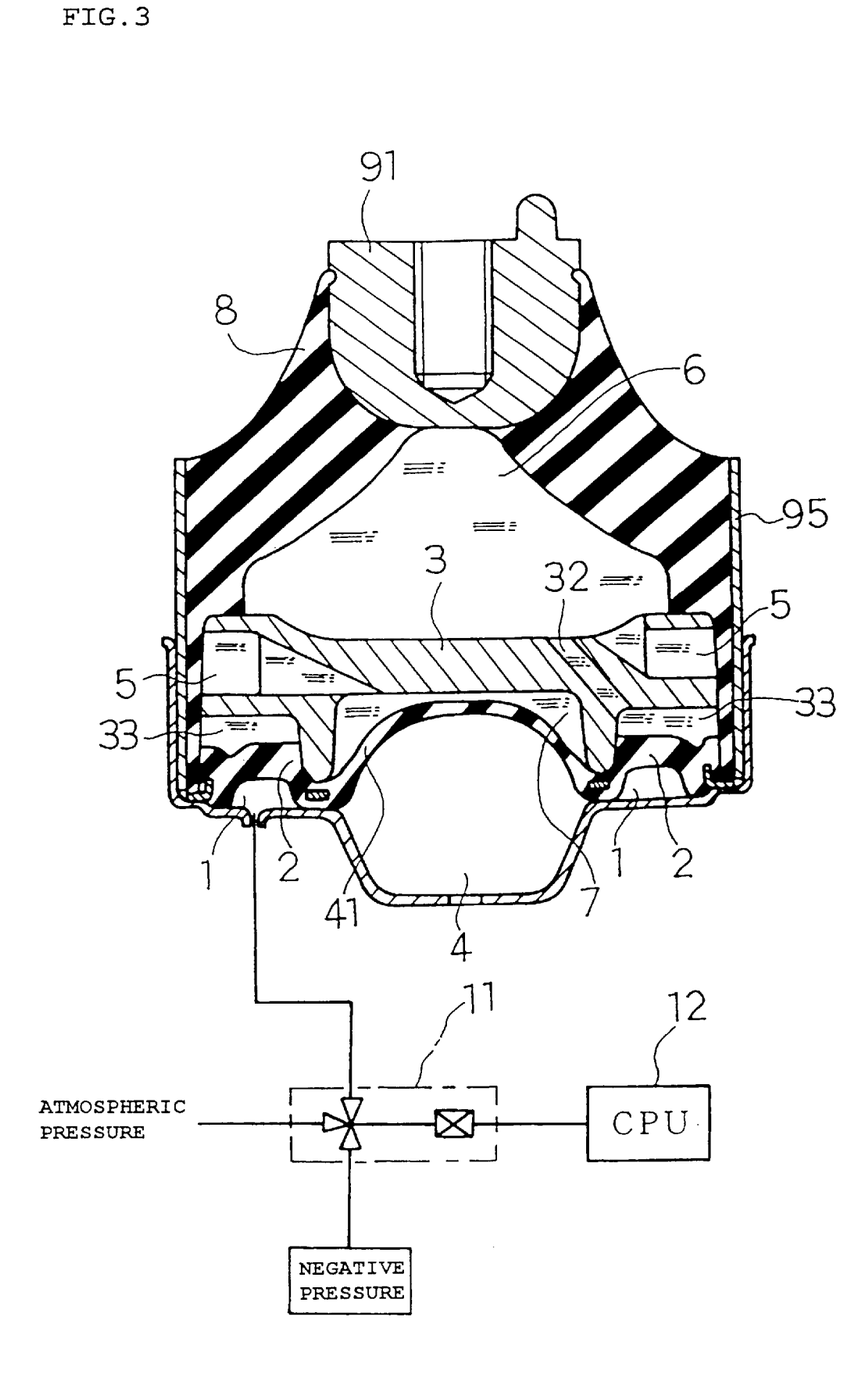
FIG. 3 is a longitudinal sectional view illustrating an entire configuration of a third embodiment of the present invention.

Next, explanation will be made of a third embodiment of the present invention with reference to FIG. 3, which is basically the same as the abovementioned second embodiment, except that the arrangement of the diaphragms are different from that of the second embodiment. That is, as to the diaphragms, a disc-like first diaphragm 41 partitioning between the air chamber 4 and the auxiliary chamber 7 is formed in a center part, and a ring-like second diaphragm 2 is formed around the disc-like first diaphragm 2. Further, both diaphragms 41, 2 are integrally incorporated with each other by a predetermined integrally molding means. Further, these diaphragms 41, 2 have their flexibly deforming stiffness which is higher of the second diaphragm 2 than of the first diaphragm 41.

Explanation will be made of a fourth embodiment of the present invention with reference to FIGS. 4 and 9, which is also basically the same as any of the first to third embodiments, except that there are further provided basically a sealed air chamber 42 made into contact with the first diaphragm 41, a third diaphragm 43 forming one of wall chambers of the sealed air chamber 42, an auxiliary working chamber 55 adapted to actuate the third diaphragm 43 and to selectively introduce negative pressure or the atmospheric pressure, and a switching means 11 which selectively performs switching operation for introducing the atmospheric pressure or negative pressure under a predetermined condition into the auxiliary working chamber 55. It is noted that, in this configuration, the sealed air chamber 42 is in the form of a sealed space defined by the first diaphragm 41 and the third diaphragm 43, and accordingly, under the action of air which is held therein, an air spring is obtained.

With this arrangement, the flexibly deforming stiffness of the third diaphragm 43 is set to be substantially equal to that of the first diaphragm 41. Accordingly, upon input of engine shake, the liquid in the main chamber 6 flows into the orifice 5 so as to obtain a predetermined damping force.

In the configuration of this embodiment, the flexibly deforming stiffness of the second diaphragm 2 partitioning between the main chamber 6 and the working chamber 1 which are communicated with each other through the intermediary of the communication passage 31, is higher than those of the first diaphragm 41 and the third diaphragm 43 forming the wall chamber of the sealed air chamber 42. Thus, when the working chamber 1 and the auxiliary working chamber 55 are both set in an atmospherically opened condition, the second diaphragm 2 is set in a condition that the flexible deformation thereof is harder than those of the first diaphragm 41 and the third diaphragm 43, and as a result, it is hard to increase the pressure of the liquid in the main chamber 6 in response to a vibration (engine shake) input into the liquid in the main chamber 6. Thus, the liquid in the main chamber 6 flows into the auxiliary chamber 7 by way of the orifice 5. Further, as to the second diaphragm 2, the first diaphragm 41 and the third diaphragm 43, as shown in FIG. 4, a disc-like second diaphragm 2 is formed in a center part, and a first diaphragm 41 and a second diaphragm 43 which are ring-like, are arranged around the second diaphragm 2. Further, they are integrally incorporated with one another by a predetermined integrally molding means. Accordingly, a diaphragm assembly composed of the first diaphragm 41, the third diaphragm 43 and the second diaphragm 42 can be formed of a single component, and accordingly, the total number of components can be reduced, thereby it is possible to aim at reducing the total manufacturing costs of the liquid filled type vibration isolator, including the cost of parts control and the manhours of assembly. It is noted that, as to the diaphragms 41, 43, in addition to the assembly in which the three diaphragms are integrally incorporated with one another, there may be considered such a configuration that the first diaphragm 41 and the second diaphragm 43 which are integrally incorporated with each other are at first assembled in liquid, and thereafter, the third diaphragm 43 is secured to a member or the like which forms the bottom wall 111 in order to all diaphragms are assembled.

Next, explanation will be made of the operation of the embodiment having the above-mentioned configuration. At first, the damping action against the engine idling vibration will be explained, which are the same as that of any of the first to third embodiments of the present invention, except that the switching means 11 is operated in response to an instruction (signal) from the control means 12 so as to hold the auxiliary working chamber 55 in a vacuum suction condition, in addition to the working chamber 1 (refer to FIG. 5). As a result, the second diaphragm 2 falls in a condition in which it is sucked to the bottom wall 11 of the working chamber 1. Further, the second diaphragm 2 is also sucked to the bottom wall side of the auxiliary chamber 55 by way of the sealed air chamber 42. The dynamic spring constant of the liquid filled type vibration isolator in response to vibration (engine idling vibration) at a specific frequency is reduced as indicated by the bold solid line shown in FIG. 9. That is, referring to FIG. 9, a lower limit value of the dynamic spring constant can be obtained in a specific frequency range (engine idling vibration range) from 15 to 20 Hz. As a result, the engine idling vibration can be effectively absorbed and isolated.

Figure 10:
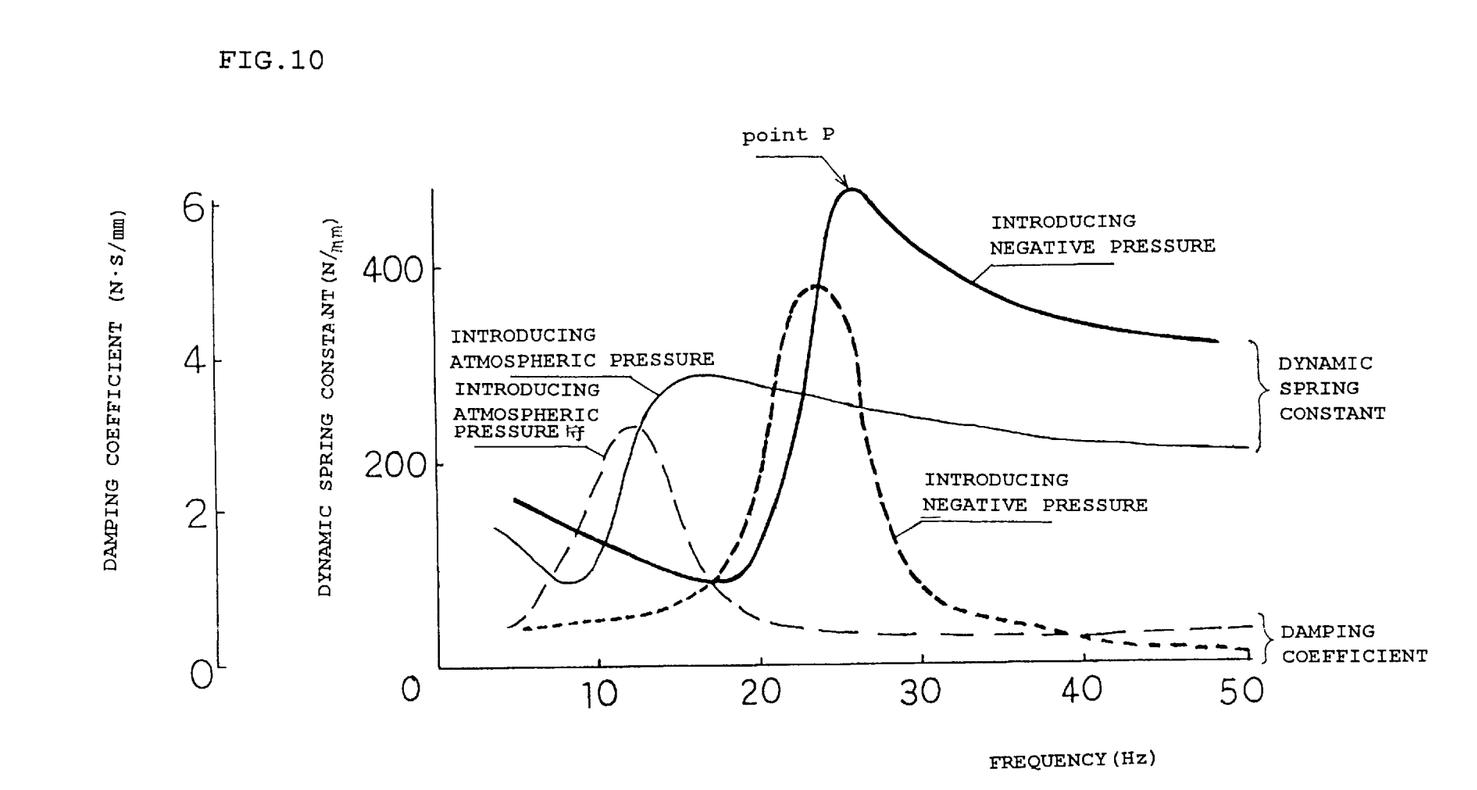
FIG. 10 is a graph showing a functional characteristic of another except for the present invention.

It is noted that in the configuration of this embodiment, the lower limit value of the dynamic spring constant can be obtained over a relatively wide range, and further, no extreme peak value is exhibited in a zone (frequency range) which is slightly deviated from a specific frequency range from 15 to 20 Hz. In general, with an oscillation system which is tuned so as to have a resonant point in a certain specific frequency range, in the case of directly exhibiting its lower limit value, an extreme peak value is exhibited in its peripheral zone, for example, as indicated by a point P shown in FIG. 10. That is, in such case that engine idling vibration varies (increases) although it is slight, in an engine mount assembly which is adjusted, for example, as shown in FIG. 10, the dynamic spring constant is extremely increased, and accordingly, engine vibration (idling vibration) cannot be absorbed and isolated upon engine idling-up.

Figure 5:
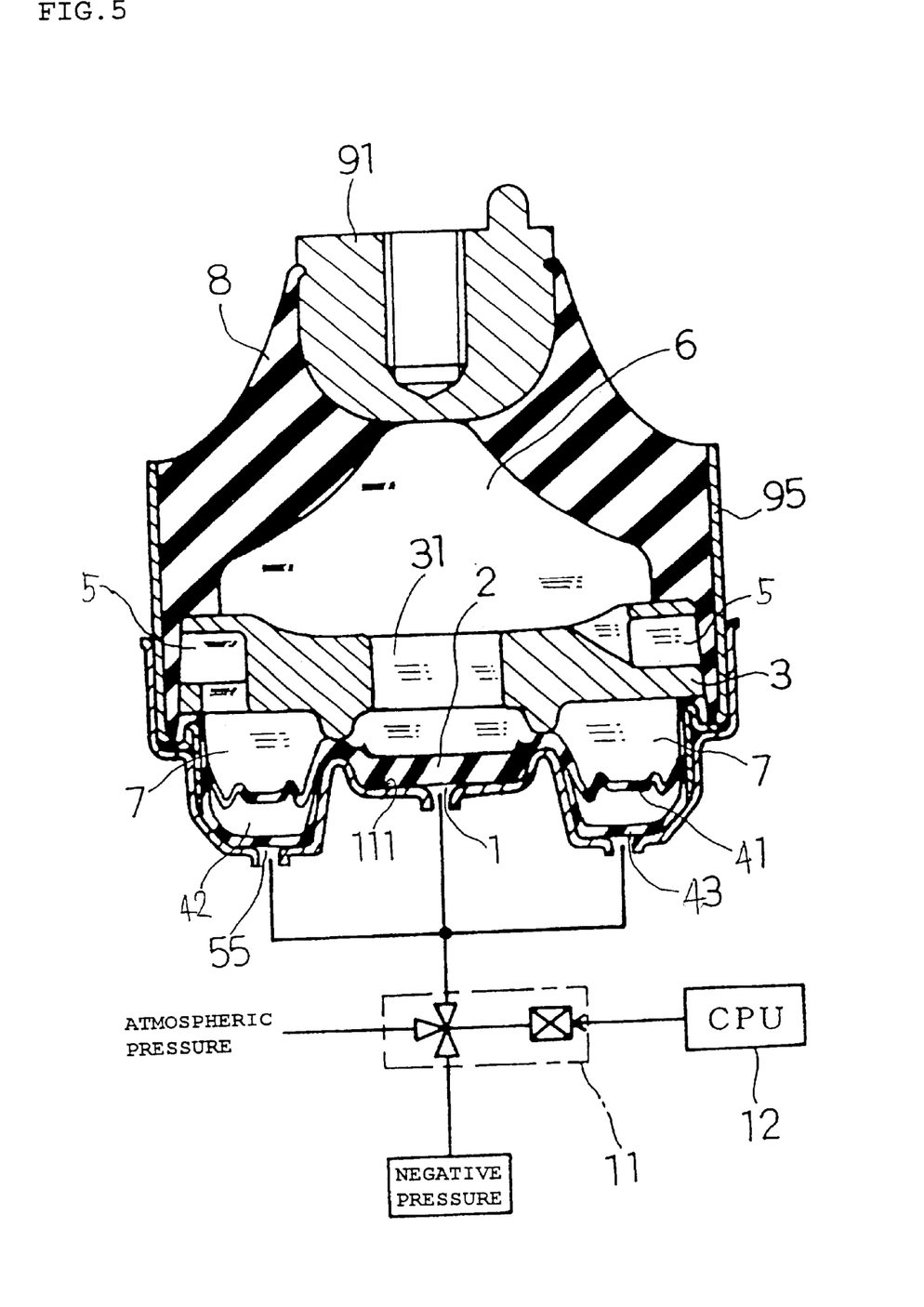
FIG. 5 is a longitudinal sectional view illustrating an entire configuration of a fifth embodiment of the present invention.
Figure 9:
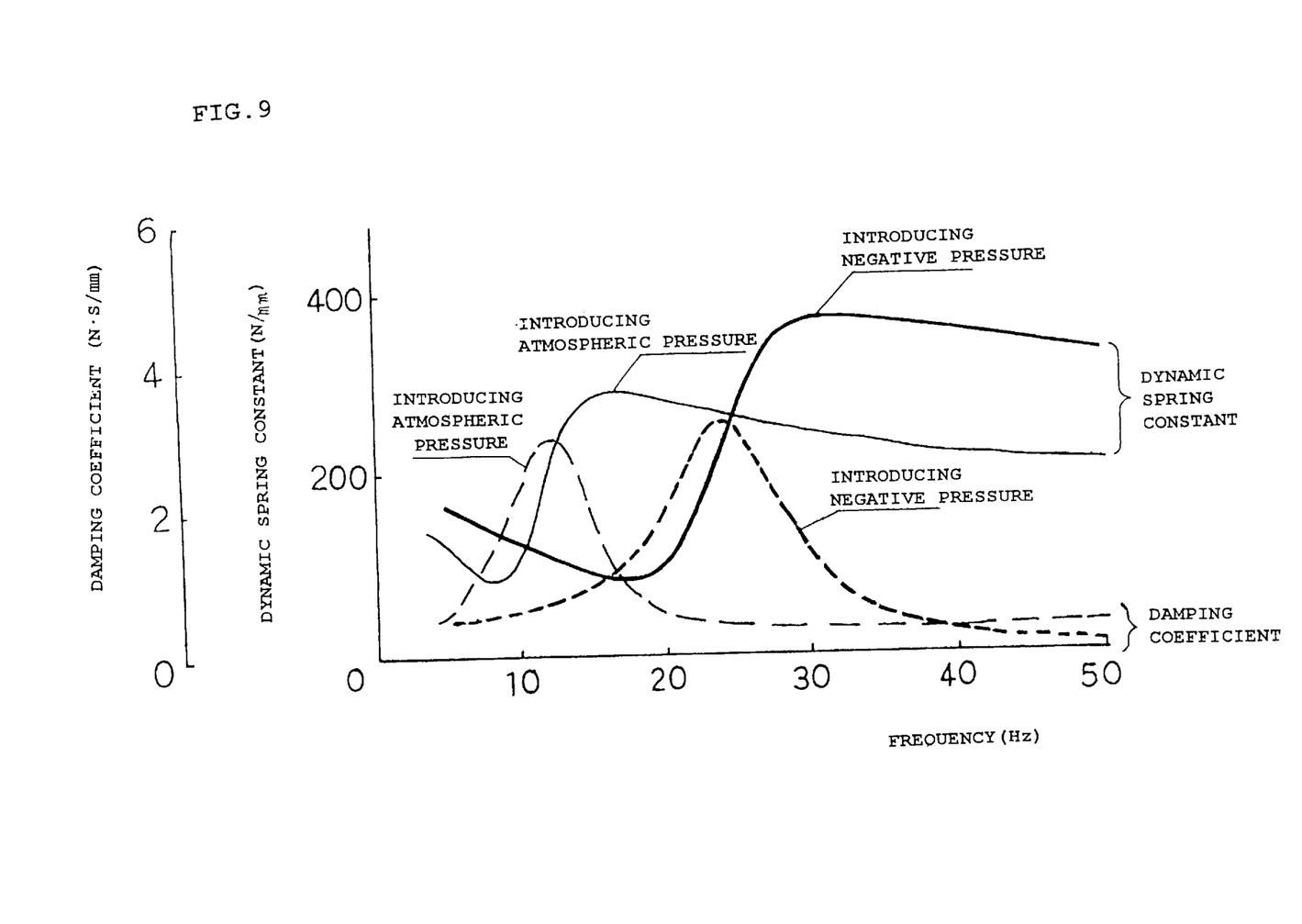
FIG. 9 is a graph showing a functional characteristic of the fourth embodiment of the present invention.

On the contrary, with the configuration of this embodiment, it is absorbed by negative pressure even also in the auxiliary working chamber 55 in addition to the working chamber 1 as shown in FIG. 5, and accordingly, the dynamic spring constant in response to an engine idling vibration input is influenced by the air spring formed by the sealed air chamber 5 so as to be generally set to a higher value (refer to FIG. 9). However, instead, no extreme peak value, as indicted by the point P in FIG. 10, is exhibited in the peripheral zone thereof. Accordingly, even though the frequency of engine idling vibration increases slightly due to engine idling-up or the like, the idling vibration at that time is prevented from being transmitted to the vehicle body side. Thus, in the configuration of this embodiment, it is possible to aim at absorbing and isolating the engine idling vibration over a wide frequency range.

Figure 4:
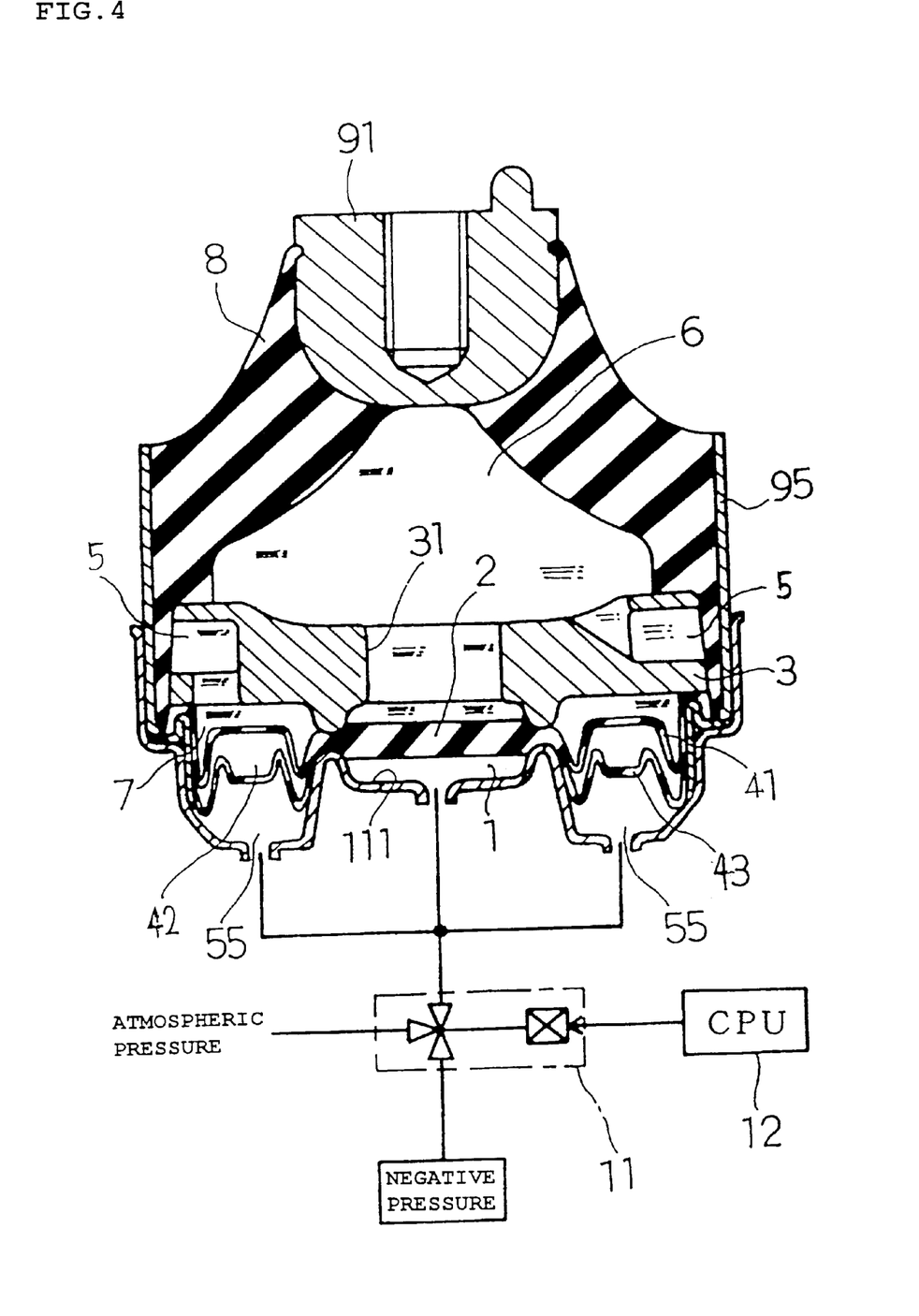
FIG. 4 is a longitudinal sectional view illustrating an entire configuration of a fourth embodiment of the present invention.

Meanwhile, as to damping of engine shake which is vibration having a frequency lower than that of the engine idling vibration, referring to FIG. 4, the switching means 11 is changed over into the atmospheric air introduction side. Then, the working chamber 1 and the auxiliary working chamber 55 are both set in an atmospherically opened condition, and accordingly, the second diaphragm 2 partitioning between the working chamber 1 and the main chamber, the first diaphragm 41 partitioning between the auxiliary chamber 7 and the sealed air chamber 42 and the third diaphragm 43 are set in a free oscillating condition. In such a condition, when vibration relating to the engine shake is inputted into the main chamber 6, the first diaphragm 41 and the second diaphragm 2 perform flexible deformation in response to variation in pressure of the liquid in the main chamber 6 since both diaphragms 41, 2 are held in the free vibrating condition. By the way, in this case, since the stiffness of the second diaphragm 2 with respect to its flexible deformation is set to be higher than those of the first diaphragm 41 and the third diaphragm 43, the liquid in the main chamber 6 preferentially flows into the orifice 5. That is, in response to the vibration input relating to the engine shake, the liquid in the main chamber 6 flows into the orifice 5 so as to obtain a high damping force (as indicated by the thin broken line in FIG. 9). As a result, the engine shake can be damped. As mentioned above, in the configuration of this embodiment, the damping force generating function for damping engine shake can be exhibited by a single orifice 5, and further, the dynamic spring constant reducing function can be exhibited through resonant action of the liquid in the orifice for damping the engine idling vibration, that is, with the use of a single orifice and with a difference in flexibly deforming stiffness between diaphragms, two kinds of vibration such as engine shake and engine idling vibration can be damped.

Figure 6:
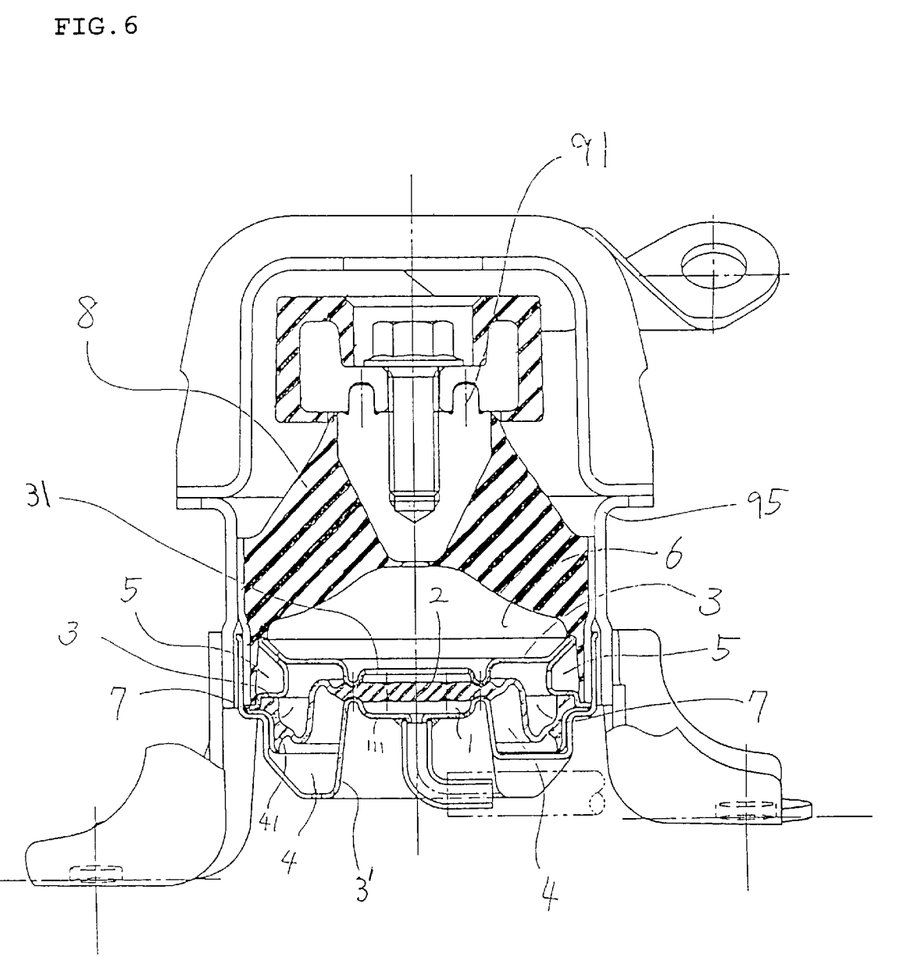
FIG. 6 is a longitudinal sectional view illustrating an entire configuration of a sixth embodiment of the present invention.

Explanation will be made of a fifth embodiment of the present invention with reference to FIG. 6, which is also basically the same as any of the first to fourth embodiments, except that a metal sheet is pressed so as to form a partition member 3 and a metal plate 3' adapted to be assembled with the partition plate 3, and with the use of these two plates, the first diaphragm 41 and the second diaphragm 2 are held therebetween so as to be fixed.

With this arrangement, according to the present invention, the following effects can be exhibited: That is, in the present invention, the partition member and the metal member can be formed by pressing a metal sheet, thereby it is possible to reduce the total manufacturing costs and lighten the total weight.

According to the present invention, with respect to a liquid filled type vibration isolator comprising a first coupling member attached to an oscillating body and a second coupling member attached to a member on the vehicle body side, a rubber-like insulator located between the first coupling member and the second coupling member, for absorbing and isolating vibration transmitted from the oscillating body, a main chamber having a chamber wall which is formed by a part of the insulator, and hermetically filled therein with liquid, an auxiliary chamber connected thereto with the main chamber through the intermediary of a first orifice and having a chamber wall a part of which is formed by a first diaphragm, a partition member partitioning between the main chamber and the auxiliary chamber, and a second diaphragm partitioning between a working chamber adapted to be selectively introduced thereinto with negative pressure or the atmospheric pressure, and the main chamber, wherein the second diaphragm defining the working chamber has a flexibly deforming stiffness which is higher than that of the first diaphragm defining the auxiliary chamber, two kinds of vibration such as, for example, engine shake and engine idling vibration can be absorbed and isolated with the use of only a single orifice.

Further, with the provision of such a configuration that a third liquid chamber is provided between the second diaphragm and the main chamber while a second orifice is provided between the third chamber and the main chamber in order to associate liquid which is present in the first orifice with liquid which is present in the second orifice, in response to a vibration input at a specific frequency, a dynamic spring constant reducing range (bottom value) can be obtained in each of two specific frequency ranges within an engine idling frequency range, thereby it is possible to aim at reducing the dynamic spring constant in a frequency range during idling-up caused by the operation of accessories, in addition to usual idling vibration. As a result, it is possible to cope with isolation of vibration in the case of two kinds of vibration, that is, usual idling vibration and vibration during idling-up, and accordingly, it is possible to efficiently absorb and isolate both kind of vibration, that is, engine idling vibration and engine shake.

Further, according to the present invention, with the provision of such a configuration that the first diaphragm and the second diaphragm are integrally incorporated with each other, it is possible to aim at reducing the costs of manufacturing these two diaphragms. That is, the two diaphragms can be integrally formed with each other with the use of a suitable integrally molding means, thereby it is possible to aim at reducing the manufacturing costs of the entire liquid filled type vibration isolator.

Furthermore, according to the present invention, with the provision of such an arrangement that there are provided a sealed air chamber made into contact with the first diaphragm in the form of a space in which air is hermetically filled, a third diaphragm forming one of chamber walls of the sealed air-chamber, and an auxiliary working chamber adapted to operate the first diaphragm and the third diaphragm which define the sealed air chamber and adapted to be selectively introduced thereinto with negative pressure or the iatmospheric pressure, a damping function against engine shake can be exhibited by a single orifice, and liquid in the orifice is subjected to resonant oscillation for engine idling vibration so as to aim at reducing the dynamic spring constant in this frequency range. As a result, with the use of a single orifice, two kinds of vibration, such as, for example, engine shake and engine idling vibration can be absorbed and isolated, that is, the two kind of vibration can be damped. Further, although the dynamic spring constant of the entire liquid filled type vibration isolator becomes higher in general in such a case that both working chambers fall in a vacuum suction condition, the dynamic spring constant in a frequency range which is slightly shifted from a specific frequency range, can be restrained from being extremely increased, due to the action of the sealed air chamber, and accordingly, it is possible to avoid extremely increasing the dynamic spring constant with respect to variation (increase) in idling vibration frequency during engine idling-up. Thereby it is possible to aim at absorbing and isolating idling vibration during engine idling-up.

What is claimed is:

1. A liquid filled type vibration isolator comprising a first coupling member attached to an oscillating body; a second coupling member attached to a member on a vehicle body side of a vehicle, said vehicle having an engine, an elastic insulator located between the first and second coupling members, for absorbing and isolating vibration transmitted from the oscillating body; a main chamber having a chamber wall which is formed by a part of the insulator, and hermetically charged therein with liquid; an auxiliary chamber communicated with the main chamber through the intermediary of a first orifice, and having a chamber wall a part of which is defined and formed by a first diaphragm, a partition member partitioning between the main chamber and the auxiliary chamber, and a second diaphragm and a bottom wall defining a working chamber into which negative pressure or the atmospheric pressure is selectively introduced, said second diaphragm partitioning between the working chamber and the main chamber, wherein the second diaphragm defining the working chamber has a flexibly deforming stiffness which is higher than that of the first diaphragm defining the auxiliary chamber, wherein said liquid filled type vibration isolator is configured to introduce said negative pressure into said working chamber when said engine is idling thereby causing said second diaphragm to remain sucked to said bottom wall, wherein said second diaphragm is interposed and pressed between a first peripheral protrusion of said partition member and a corresponding second peripheral protrusion of said second coupling member provided on said bottom wall of said working chamber, and wherein a third liquid chamber is provided between the second diaphragm and the main chamber, and a second orifice is provided between the third liquid chamber and the main chamber, said third liquid chamber having a larger volume at its periphery and a smaller volume in its center, and said second orifice extending axially into a region bounded by the periphery of said third liquid chamber.

2. A liquid filled type vibration isolator as set forth in claim 1, wherein liquid in the first orifice and liquid in the second orifice are associated with each other with respect to vibration at a specific frequency.

3. A liquid filled type vibration isolator as set forth in claim 1, wherein the fist diaphragm and the second diaphragm are integrally formed with each other.

4. A liquid filled type vibration isolator as set forth in claim 2, wherein the first diaphragm and the second diaphragm are integrally formed with each other.

5. A liquid filled type vibration isolator as set forth in claim 1, wherein the partition member and a metal member assembled with the partition member are formed by pressing a metal sheet, and the first diaphragm and the second diaphragm are held and secured between the two members.

6. A liquid filled type vibration isolator as set forth in claim 2, wherein the partition member and a metal member assembled with the partition member are formed by pressing a metal sheet, and the first diaphragm and the second diaphragm are held and secured between the two members.

7. A liquid filled type vibration isolator as set forth in claim 3, wherein the partition member and a metal member assembled with the partition member are formed by pressing a metal sheet, and the first diaphragm and the second diaphragm are held and secured between the two members.

8. A liquid filled type vibration isolator as set forth in claim 4, wherein the partition member and a metal member assembled with the partition member are formed by pressing a metal sheet, and the first diaphragm and the second diaphragm are held and secured between the two members.

* * * * *